(12) United States Patent
Baxter

(10) Patent No.: US 8,473,911 B1
(45) Date of Patent: Jun. 25, 2013

(54) DOCUMENTATION GENERATION FROM A COMPUTER READABLE SYMBOLIC REPRESENTATION

(75) Inventor: Michael A. Baxter, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 530 days.

(21) Appl. No.: 12/842,784

(22) Filed: Jul. 23, 2010

(51) Int. Cl.
G06F 9/44 (2006.01)
G06F 9/45 (2006.01)

(52) U.S. Cl.
USPC .......................... 717/123; 717/136; 717/143

(58) Field of Classification Search
None
See application file for complete search history.

(56) References Cited

U.S. PATENT DOCUMENTS

| | | |
|---|---|---|
| 4,980,577 A | 12/1990 | Baxter |
| 5,177,679 A | 1/1993 | Baxter |
| 5,481,743 A | 1/1996 | Baxter |
| 5,511,181 A | 4/1996 | Baxter |
| 5,551,017 A | 8/1996 | Baxter |
| 5,794,062 A | 8/1998 | Baxter |
| 5,805,871 A | 9/1998 | Baxter |
| 5,826,096 A | 10/1998 | Baxter |
| 5,854,918 A | 12/1998 | Baxter |
| 5,933,642 A | 8/1999 | Greenbaum et al. |
| 5,978,477 A | 11/1999 | Hull et al. |
| 6,021,186 A | 2/2000 | Suzuki et al. |
| 6,058,469 A | 5/2000 | Baxter |
| 6,077,315 A | 6/2000 | Greenbaum et al. |
| 6,182,206 B1 | 1/2001 | Baxter |
| 6,594,752 B1 | 7/2003 | Baxter |
| 6,665,086 B2 | 12/2003 | Hull et al. |
| 6,675,306 B1 | 1/2004 | Baxter |
| 6,704,118 B1 | 3/2004 | Hull et al. |
| 6,961,842 B2 | 11/2005 | Baxter |
| 6,976,032 B1 | 12/2005 | Hull et al. |
| 7,007,264 B1 | 2/2006 | Baxter |
| 7,114,055 B1 | 9/2006 | Baxter |
| 7,146,395 B2 | 12/2006 | Baxter |
| 7,155,664 B1 * | 12/2006 | Lee et al. ...................... 717/123 |
| 7,167,191 B2 | 1/2007 | Hull et al. |

(Continued)

OTHER PUBLICATIONS

Norton R. Greenfeld, Quantification in a relational data system, [Online ] May 1974, AFIPS '74 Proceedings of the May 6-10, 1974, national computer conference and exposition, [Retrieved from the Internet] <http://delivery.acm.org/10.1145/1510000/1500189/p71-greenfeld.pdf>, pp. 71-75.*

(Continued)

Primary Examiner — Thuy Dao
Assistant Examiner — Ravi K Sinha
(74) Attorney, Agent, or Firm — W. Eric Webostad

(57) ABSTRACT

Generation of documentation from a computer readable symbolic representation is described. In an embodiment, a reified version of an input is obtained as coded objects. The input is readable by a programmed computer for execution, and is in an applied form of a symbolic representation of knowledge for a defined domain of knowledge. The reified version is a coded form of the applied form, wherein the coded objects are in a dynamic language. A content sequence library is accessed by the programmed computer responsive to the coded objects to extract content for a document plan. A reasoning library is then accessed by the programmed computer responsive to the content extracted to provide a sequenced organization of phrase structure for the content extracted. A natural language representation of the input is output from a realization of the sequenced organization of phrase structure.

20 Claims, 5 Drawing Sheets

U.S. PATENT DOCUMENTS

| | | | |
|---|---|---|---|
| 7,170,629 B2 | 1/2007 | Hull et al. | |
| 7,454,658 B1 | 11/2008 | Baxter | |
| 7,493,472 B2 | 2/2009 | Baxter | |
| 7,577,901 B1 | 8/2009 | Hull et al. | |
| 7,602,518 B2 | 10/2009 | Hull et al. | |
| 7,616,628 B2 | 11/2009 | Baxter | |
| 7,627,479 B2* | 12/2009 | Travieso et al. | 704/277 |
| 7,640,532 B2* | 12/2009 | Jain et al. | 717/123 |
| 7,650,248 B1 | 1/2010 | Baxter | |
| 7,653,925 B2 | 1/2010 | Hull et al. | |
| 7,669,127 B2 | 2/2010 | Hull et al. | |
| 7,684,068 B2 | 3/2010 | Hull et al. | |
| 7,703,075 B2* | 4/2010 | Das et al. | 717/123 |
| 7,945,904 B2* | 5/2011 | Meijer et al. | 717/143 |
| 8,006,225 B1* | 8/2011 | Braun et al. | 717/123 |
| 8,286,150 B2* | 10/2012 | Yamashita | 717/143 |
| 8,336,035 B2* | 12/2012 | Lambert et al. | 717/136 |
| 2005/0289456 A1* | 12/2005 | Bier | 715/513 |
| 2007/0169021 A1* | 7/2007 | Huynh et al. | 717/136 |
| 2010/0058293 A1* | 3/2010 | Dunagan et al. | 717/116 |
| 2011/0154433 A1* | 6/2011 | Karabulut | 726/1 |
| 2011/0167404 A1* | 7/2011 | Liu et al. | 717/143 |
| 2012/0311536 A1* | 12/2012 | Fanning et al. | 717/123 |
| 2012/0311546 A1* | 12/2012 | Fanning et al. | 717/136 |

OTHER PUBLICATIONS

Niels Schutte, Generating Natural Language descriptions of ontology concepts, [Online] 2009, ENLG '09 Proceedings of the 12th European Workshop on Natural Language Generation, [Retrieved from the Internet] <http://delivery.acm.org/10.1145/1620000/1610212/p106-schutte.pdf> pp. 106-109.*

Krieger, Hans-Ulrich; Schafer, Ulrich. DL meet FL: a bidirectional mapping between ontologies and linguistic knowledge, [Online] Aug. 2010, Proceedings of the 23rd International Conference on Computational Linguistics: Posters, [Retrieved from the Internet] <http://delivery.acm.org/10.1145/1950000/1944633/p588-krieger.pdf> pp. 588-596.*

Kuhn et al.,Semantic clustering: Identifying topics in source code, [Online] Information and Software Technology vol. 49, Issue 3, Mar. 2007, [Retrieved from the Internet] <http://www.sciencedirect.com/science/article/pii/S0950584906001820> pp. 230-243.*

Reiter, Ehud and Dale Robert, Building Natural Language Generation Systems, Cambridge University Press, ISBN 0-521-62036-8, Chapter 3, "The Architecture of a Natural Language Generation System," Jan. 2000, pp. 41-77, Figure 3.7 An NLG system architecture, pp. 60.

* cited by examiner

DOCUMENTATION GENERATION FROM A COMPUTER READABLE SYMBOLIC REPRESENTATION

FIELD OF THE INVENTION

An embodiment of the invention relates to documentation generation. More particularly, an embodiment of the invention relates to automated generation of documentation from a computer readable symbolic representation.

BACKGROUND OF THE INVENTION

For some time, people have performed critical interpretation of ancient documents. Seeking an explanation from ancient documents is generally referred to exegesis. The exposition of the meaning or purposes of an ancient document by painstaking detailed examination is generally a time consuming processes.

More recently, translation from one language to another has been made easier by computer- or web-implemented translators. In these translators, words or phrases in one natural language can be associated with words or phrases in another natural language. However, the accuracy of such translations may be negatively impacted due to the wide variety of knowledge and expressions of that knowledge.

While computer- or web-implemented translation is for translation from a natural language to another natural language, translations of computer language are common in the computer industry. Translation from one high-level computer language to another high-level computer language may be performed by a source-to-source translator. Furthermore, computer programs known as compilers convert source code written in a high-level computer language into object code written in a low-level computer language. Compilers generally involve very detailed syntax and rules for the source code, and thus the range of expression is more narrowly defined than in natural language-to-natural language translation.

However, computer programs, among other forms of computer readable listings, are generally more difficult for humans to easily understand in comparison to natural language expression. For example, unless source code is substantially manually remarked by a programmer, it may be difficult for another programmer who is not the originator of the source code to understand the meaning expressed. In other words, the subsequent programmer may have to perform a painstaking detailed examination, which is generally a time-consuming process, in order to understand the meaning expressed in such source code.

Additionally, it may be a time-consuming process to generate documentation to explain how the source code operates. For example, technical writers tasked with developing documentation for programs may not be computer programmers, and thus the exchange between programmer and technical writer to produce documentation for a program may be substantially time consuming.

Accordingly, it would be desirable and useful to provide means that speeds up the process for converting a computer readable listing into a more natural language description of the expression of the listing.

SUMMARY OF THE INVENTION

One or more embodiments generally relate to the generation of documentation from a computer readable symbolic representation.

An embodiment relates generally to a method for documentation generation. In such an embodiment, a reified version of an input is obtained as coded objects. The input is in an applied form of a symbolic representation of knowledge for a defined domain of knowledge. The reified version is a coded form of the applied form, wherein the coded objects are in a dynamic language. The reified version is stored. A content sequence library is accessed responsive to the coded objects to extract content for a document plan. A reasoning library is then accessed responsive to the content extracted to provide a sequenced organization of phrase structure for the content extracted. A natural language representation of the input is output from a realization of the sequenced organization of phrase structure.

Another embodiment relates generally to a method for documentation generation. In such an embodiment, input is reified into coded objects in a dynamic language. A content-reasoning library is data mined to provide meaning of the coded objects, wherein the data mining includes determining relationships of the coded objects to one another to provide the meaning and the content-reasoning library includes a symbolic representation of knowledge for a defined domain. The meaning is realized as a document object model. An interface library is accessed for converting the document object model into a document. The document is output.

Yet another embodiment is a non-transitory machine-readable medium having stored thereon information representing instructions that, when executed by general purposed programmed computer, cause the programmed computer to perform operations as a special-purpose programmed computer. In such an embodiment, the performed operations include: reifying input into coded objects in a dynamic language; and data mining a content-reasoning library to provide meaning of the coded objects. The data mining includes determining relationships of the coded objects to one another to provide the meaning. The content-reasoning library includes a symbolic representation of knowledge for a defined domain. The performed operations further include: realizing the meaning as a document object model; accessing an interface library for converting the document object model into a document; and outputting the document.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
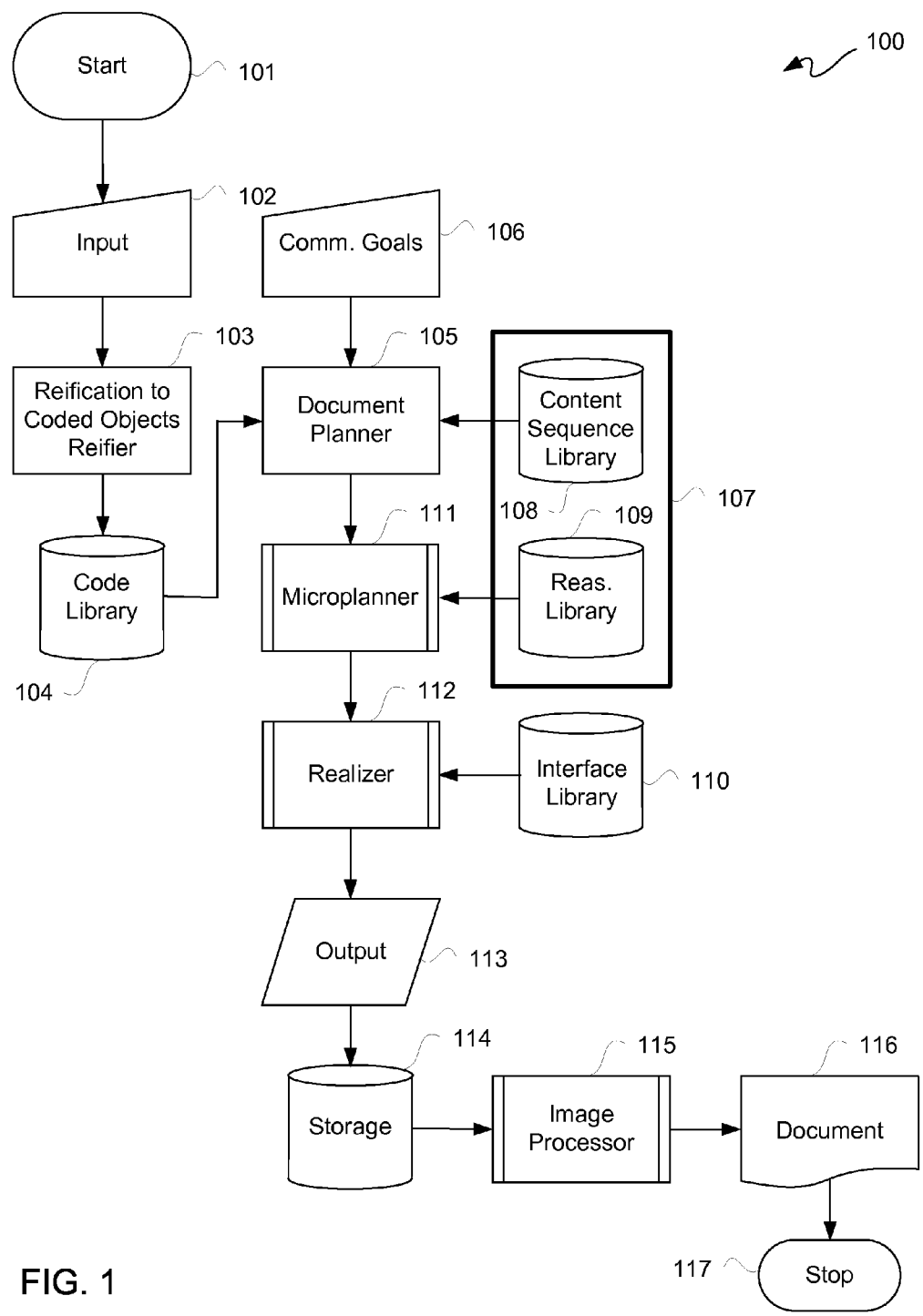
FIG. 1 is a flow diagram depicting an exemplary embodiment of a document generation flow.

Reference will now be made in detail to embodiments, examples of which are illustrated in the accompanying drawings. In the following detailed description, numerous specific details are set forth in order to provide a thorough understanding of the following described embodiments. It should be apparent, however, to one skilled in the art, that the embodiments described below may be practiced without all the specific details given below. Moreover, the embodiments are not intended to be exhaustive or to limit the invention to the precise forms disclosed, and modifications and variations are possible in light of the following teachings or may be acquired from practice of the invention. The embodiments were chosen and described in order to best explain principles and practical applications of the invention to enable others skilled in the art to utilize the invention in various embodiments and with various modifications as are suited to the particular use contemplated. In other instances, well-known methods, procedures, components, circuits, and networks have not been described in detail so as not to unnecessarily obscure the described embodiments.

For purposes of explanation, specific nomenclature is set forth to provide a thorough understanding of the various inventive concepts disclosed herein. However, the terminology used herein is for the purpose of describing particular embodiments only and is not intended to be limiting of the invention. As used herein, the singular forms "a", "an," and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Inventive concepts described herein may be embodied as apparatus, method, system, or computer program product. Accordingly, one or more of such embodiments may take the form of an entirely hardware embodiment, an entirely software embodiment (including firmware, resident software, and micro-code, among others) or an embodiment combining software and hardware, and for clarity any and all of these embodiments may generally be referred to herein as a "circuit," "module," "system," or other suitable terms. Furthermore, such embodiments may be of the form of a computer program product on a computer-usable storage medium having computer-usable program code in the medium.

Any suitable computer-usable or computer-readable medium may be utilized for input, such as input 102 of FIGS. 1 and 2 described below for example. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to the Internet, wireline, optical fiber cable, radio frequency (RF) or other means. It should be understood that output provided, such as output document 116 of FIGS. 1 and 2 described below for example, may be in any medium, for example but not limited to electronic, magnetic, optical, electromagnetic, infrared, ink, or the like for displaying, projecting, printing, embossing, transmitting, beaming, or the like.

Computer program code for carrying out operations in accordance with inventive concepts described herein may be written in an object-oriented dynamic binding programming language such as Lisp, Python, Ruby, Perl, or the like. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Systems and methods described herein may relate to an apparatus for performing the operations associated therewith. This apparatus may be specially constructed for the required purposes, or it may comprise a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

The embodiments are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

FIG. 1 is a flow diagram depicting an exemplary embodiment of a document generation flow 100. From start 101 to stop 117, flow 100 is generally an automated process for generating a manual, pamphlet, data sheet, book, user guide, or other documentation responsive to an input and optionally selected communication goals. It should be understood that FIG. 1, as well as FIG. 2 herein, is capable of being described as a system and a method.

At 102, an input is received or obtained. Input 102 may be a computer program or other listing that is readable by a programmed computer for execution. In the embodiment described herein, input 102 is textual. However, optionally, an interpreter (not shown) or other information retrieval device capable of converting or otherwise interpreting text from graphics, audio, video, or pictorial information may be used to provide input 102 as text. Accordingly, it should be understood that a programmed computer capable of reading input 102 as text may be configured or programmed as described herein to infer meaning from input 102 in order to generate for output documentation in a natural language, namely conversion of the meaning as expressed in a computer readable form into a natural language form of such expression. In the embodiment described herein, such output documentation, such as document 116, includes text and optionally graphics. However, in other embodiments such documentation, such as document 116, may include any of text, pictures, graphics, video, audio, or any combination thereof depending on the resources made available for natural language expression. Document 116 output thus may vary in content depending on the application for such document, as well as may vary in how such content is expressed. However, for purposes of clarity by way of example and not limitation, it shall be assumed that input 102 is completely textual, and that document 116 includes text and may include graphics.

At 103, input 102 is reified to coded objects. Reification, as used herein, philosophically may be thought of as treating an abstraction of a materially or perceptually real thing for a reasonably narrow domain of knowledge, where such abstraction is in a code form, as if the abstraction itself is the real thing. In an embodiment, such reification may be performed manually, as described below herein with reference to FIG. 4, by a person reifier 103. Generating, with a programmed computer, a reified version of input 102 as objects may be performed as an artificial intelligence coding of input 102. Thus, optionally, such reification may be performed by an artificial intelligence reifier 103. An artificial intelligence reifier 103 may be implemented in more frequently and widely used deployments, and as such an artificial intelligence reifier 103 may for example be hosted as a web service, such as via an automated web bot form, a knowledge-acquisition form configured to "interview" a domain knowledge user, or other artificial intelligence form. Because input 102 is readable by a programmed computer for execution, input 102 has a defined structure and syntax that may be readily understood by a programmed computer. Thus, input 102 may be thought of as an applied form of a symbolic representation of knowledge for a defined domain of knowledge. In other words, input 102 may be a virtual representation of an actual thing. In short, reification of input 102 by reifier 103 is coding of an applied form to provide a coded form of input 102, which as indicated above may be a completely textual input 102. Furthermore, the domain of knowledge associated with input 102 should be a well defined and reasonably bounded domain, as described below in additional detail.

A result of reification by reifier 103 is stored at 104. Output of reifier 103 may be provided to code library 104 for storage. In other words, the coded form of input 102 is stored at code library 104. The coded objects of code library 104 may be in a dynamic language. More particularly, the dynamic language may be an object-oriented dynamic binding language. Examples of such dynamic language include Lisp, Python, Ruby, and Perl. However, any object-oriented dynamic binding language may be used.

Input 102 may, though need not be, a manual input as illustratively depicted. Optionally, input 102 may be readable in whole or in part by a programmed computer for automatic or semiautomatic input. However, if input 102 is readable by a programmed computer, the reification process is more easily automated. Once a code library 104 is more fully developed for a defined domain of knowledge, such code library 104 may be reused for other inputs within such domain. For purposes of clarity by way of example and not limitation, it shall be assumed that input 102 is readable by a programmed computer for execution. Examples of input 102 may be a library of circuits described using a hardware description language, an instruction set for a processor, or other well defined and reasonably bounded domain of knowledge. Thus, for example, it should be understood that as people produce circuit designs, computer programs, or other artifacts within a domain of knowledge, input 102 may be the form of an application within a defined domain of knowledge, namely a subset of a defined domain of knowledge. However, initially input 102 may be more akin to a lexicon for a defined domain of knowledge.

Thus, for example, an instruction set for a processor may be the initial defined domain of knowledge, in contrast to an application using instructions from such instruction set. Such an instruction set could then be reified to provide a lexicon of coded objects for such instruction set, from which coded objects could subsequently be selected for such an application input, such as a computer program executable by such processor, to be reified.

In another example, a library of circuits described using a hardware description language ("HDL"), such as Verilog, VHDL, and the like, may be the defined domain of knowledge, in contrast to an application using circuits from such circuit library. Such a circuit library could then be reified to provide a lexicon of coded objects therefor, from which coded objects could subsequently be selected for such an application input, such as a circuit design capable of being placed and/or routed by a programmed computer, to be reified. In such an embodiment, input may be expressed as one or more netlists in an HDL or other circuit description language.

It should be understood that input 102 is not limited to circuit libraries, or processor instruction sets, or applications of those inputs. Other examples of input 102 include but are not limited to other types of computer programs, spreadsheet tables, and other symbolic representations of an applied form of knowledge for a defined domain of knowledge that can be codified into objects.

For purposes of an initial construction of code library 104 for a defined domain of knowledge, input 102 may represent a lexicon of knowledge of such domain. However, in contrast to reification of natural language with artificial intelligence providing a translation of "common sense", the domain of knowledge is more narrowly tailored in this application. For example, the structure associated with an instruction set for a microprocessor has a limited number of instructions and combinations of instructions as well as contexts for those constructions in which a microprocessor will execute. Likewise, within a library of circuits, there may be a limited number of types of circuits that may be accessible. However, input 102 may be any of a variety of combinations of those circuits. Additionally, it should be appreciated that as the new circuits or new instructions are developed, code library 104 may progressively grow. In other words, as new developments occur within a defined domain of knowledge, those new developments may be reified into coded objects for addition to code library 104.

Accordingly, it should be understood that once a defined domain of knowledge is reified to objects for storage in code library 104, then other artifacts within that defined domain may be more readily generated, leveraging the existence of such code library 104. However, it should be understood that an initial reification of a defined domain of knowledge may be useful. For example, a reified version may be used to count the number and type of objects in an input 102. For the example of input 102 being a circuit design described using a Hardware Description Language or other textual-based circuit description, a reified version may be used to report about the number, name, and types of ports in such circuit design. It should be understood that understanding "common-sense" or "context" is not necessary for such reification. In other words, for generation rather than parsing, reification as described herein may generally be thought of as a "context-free" analog to Avram Noam Chomsky's hierarchy for language.

From stored reified coded objects obtained in code library 104 for an input 102, a document plan by a document planner may be invoked at 105. Optionally, at 106, communication goals may be selected for input to document planner 105. Communication goals input 106 may affect the structure of the document plan.

A document plan may be thought of as the form of the type of document to be produced as document 116. For example, a manual would have a different format than a data sheet, and a user guide may have detailed outline, whereas a quick-start reference guide may have a general outline. For purposes of clarity by way of example and not limitation, it shall be assumed that document planner 105 is generally configured for an outline for a user guide; however, it should be understood that other types of documents may likewise be implemented by document planner 105.

A content-reasoning library 107 may be accessed for populating, such as with text and/or graphics, a document plan. Content-reasoning library 107 includes a symbolic representation of knowledge for a defined domain.

At 105, coded objects obtained from code library 104 by a computer programmed with a document planner may be used to access a content sequence library 108 of content-reasoning library 107. More particularly, a programmed computer may access content sequence library 108 responsive to coded objects obtained from code library 104 to extract content for a document plan of document planner 105. Such content would be populated within the outline of document planner 105. In other words, coded objects would be distributed within a document plan by document planner 105, and content associated with those coded objects obtained from content sequence library 108 would accordingly be likewise distributed throughout such document plan by document planner 105.

One form of accessing content sequence library 108, as well as reasoning library 109 also of content-reasoning library 107, may be via data mining. Data mining may be used to determine relationships of coded objects obtained from code library 104 to one another to provide or infer meaning.

Examples of communication goals 106 with respect to for example an instruction set may be to list all the instructions of the instruction set and to indicate how many instructions there are. Another communication goal may be to provide a definition in natural language for each of those instructions and to indicate how those instructions are processed. These would be examples of communication goals that may be provided at 106 for an instruction set; however, it should be understood that the communication goals selected may vary depending on the application, including without limitation the document plan. For example, content selected may be the actual definitions of instructions and the break out of instructions by type, as well as instruction dependencies or other associations, which might be included in a glossary in a document, and thus subject to the document plan.

Thus, document planner 105 may be thought of as building a data structure. A document plan may be a tree or a list, a combination thereof, or other data structure. Accordingly, content sequence library 108 may store in symbolic form structures of nodes with reference listings, definitions, or dictionaries for a set of objects for a defined domain of knowledge. The structures of nodes in content sequence library 108 may be ported in whole or in part to form a data structure for document planner 105. Thus a populated document plan of document planner 105 may generally be thought of as a sequence of symbols, where the symbols are effectively representations of communication goals, with support for effectively concatenating or generally linking the sequence with content obtained from content sequence library 108.

At 111, a document plan or data structure from document planner 105 is merged into a microplanner, where microplanner 111 has access to reasoning library 109 of content-reasoning library 107. Accordingly, it should be understood that a unified content-reasoning library 107 may be implemented; however, breaking-out sequencing from reasoning may provide more clarity with respect to understanding document generation flow 100. After sequencing coded objects with respect to document planner 105 and obtaining content therefor, meaning of those objects may be provided by microplanner 111 using reasoning library 109.

At 111, reasoning library 109 is accessed by a programmed computer with a microplanner responsive to content extracted from content sequence library 108 and populated in a data structure of document planner 105 to provide sequenced organization of phrase structure for such content extracted within such data structure. It should be understood that the phrase structure is not limited to merely accessing literal text and/or graphics; rather, the generation may further involve function calls, operations on variables, and other means for conveying meaning. Thus, whereas the content sequence library 108 may be data mined responsive to coded objects in document planner 105 to directly pull content, microplanner 111 access of reasoning library 109 is data mining with iteration. In other words, microplanner illiterates over objects within data structures produced by document planner 105, evaluating each item according to rules defined in reasoning library 109. Those skilled in the art will recognize this processing as an example of the Interpreter Design Pattern. The actions performed by reasoning library 109 are that of rule-based interpretation of objects in data structures produced by document planner 105, for the purpose of producing a sequence organization that offers natural language phrase structure in a narrow knowledge domain of interest. Thus, iterating over content extracted from content sequence library 108, meaning of coded objects obtained from code library 104 in a data structure of document planner 105 may be interpreted by microplanner 111 to provide an interpreted meaning therefor.

From the interpreted meaning, actions may be produced by microplanner 111 responsive to the interpreted meaning of such coded objects, and inferences responsive to such actions for expressing relationships as between the coded objects may be produced by microplanner 111. The relationships may be determined for providing a natural language representation of the meaning. Such natural language representation at this stage may be a set of rules for interpreting symbolic objects, including any data contained or associated with such symbolic objects. Again, the natural language representation may be expressed using text and/or graphics in this example. Graphics may be generated as text, responsive to interpretation as described above. In this embodiment, "natural language representation" for graphics may be interpretation of data objects output from document planner 105 by microplanner 111, by making calls to a graphics drawing routine. This places commands to render text that represents graphic objects interstitially with document text, by the realizer 112. So the form of representation of graphics is program code in microplanner 111, and as text in output from realizer 112.

It should be appreciated that if code library 104 is written in Lisp, where lines of code are data, it may be syntactically easier if content-reasoning library 107, namely content sequence library 108 and reasoning library 109, is likewise written in Lisp. This provides a clearer linkage between coded objects and their meaning which may be dependent upon syntactic relationships. In other words, inferring meaning of reified objects is more directly linked if for example Lisp is used in both libraries 104 and 107. In an embodiment, Common Lisp, American National Standard X3.226, may be used. Even though the example of Lisp was used, it should be understood that other object-oriented dynamic binding computer program languages may be used. Furthermore, even though it may be useful to have libraries 104 and 107 written in the same object-oriented dynamic binding computer program language, such libraries may be written in different object-oriented dynamic binding computer program languages. In short, flow 100 may effectively implement a program-writing program or system.

Thus, microplanner 111 iterates over organized content in a data structure obtained from document planner 105 for inferring meaning. Microplanner 111 creates phrase structure within the sections of document planner 105 in a natural language format. In short, a programmed computer accesses reasoning library 109 responsive to content extracted from content sequence library 108 to provide a sequence organization of phrase structure for such content extracted. It should be understood that what is organized in a tree or list or combination thereof in document planner 105 is the reified object information. By iteratively data mining responsive to reified object information, a natural language description of meaning in input 102 may be produced.

At 112, realization from microplanner 111 output is performed. Realization may be performed by a programmed computer with realizer 112. Realizer 112 may access an interface library 110 for such realization. An example of an interface library 110 that may be used is LaTex and image processing may be preformed by a LaTeX program as image processor 115. However, other document realization software and libraries may be used, such as from Adobe, and Microsoft, among other desktop publishing software vendors.

Realizing meaning by realizer 112 is effectively converting output from microplanner 111 into a document object model. An interface library 110 is accessed to convert the document object model into a document. Output 113 from realization at 112 is effectively "surface" realization of a document. Thus, realization at 112 is effectively taking the iterated result from microplanner 111 and rendering it as text and/or graphics in the form of a natural language representation of input 102, namely a natural language representation from a realization of the sequence organization of phrase structure obtained from microplanner 111.

Output 113 from realizer 112 may be stored in storage 114 for image processing by a predefined image processor 115. Image processor 115 may render an image of text and/or graphics for producing a document 116. Such document 116 may be in any of a variety of formats, including without limitation LaTex, Postscript, or Adobe pdf, among others. After which, at 117, flow 100 may be stopped.

To recapitulate, real world human knowledge for a defined domain of knowledge is input. The information input is reified into coded objects. The reification is the process of converting the input into symbols in a programming language, where the programming language is an object-oriented dynamic binding language. To support a natural language text graphics generation, a three layer model is used, namely a document planner, a predefined microplanner, and a predefined surface realizer. In connection with such three-layer model, there are containers or libraries for respectively storing content and reasoning for inferring what symbols mean, as well as or storing interfaces. A reasoning library is program code that reads the symbols and makes inferences regarding the symbols. There is an interface library for realizing a natural language output. A reasoning library may include data mining capability; however, any algorithm capable of looking at the meaning of a relationship between objects may be implemented. In other words, it should be understood that data mining may be more powerful than needed for some applications, and thus a simpler algorithm for inferring meaning based on the relationship between objects may be used.

Figure 2:
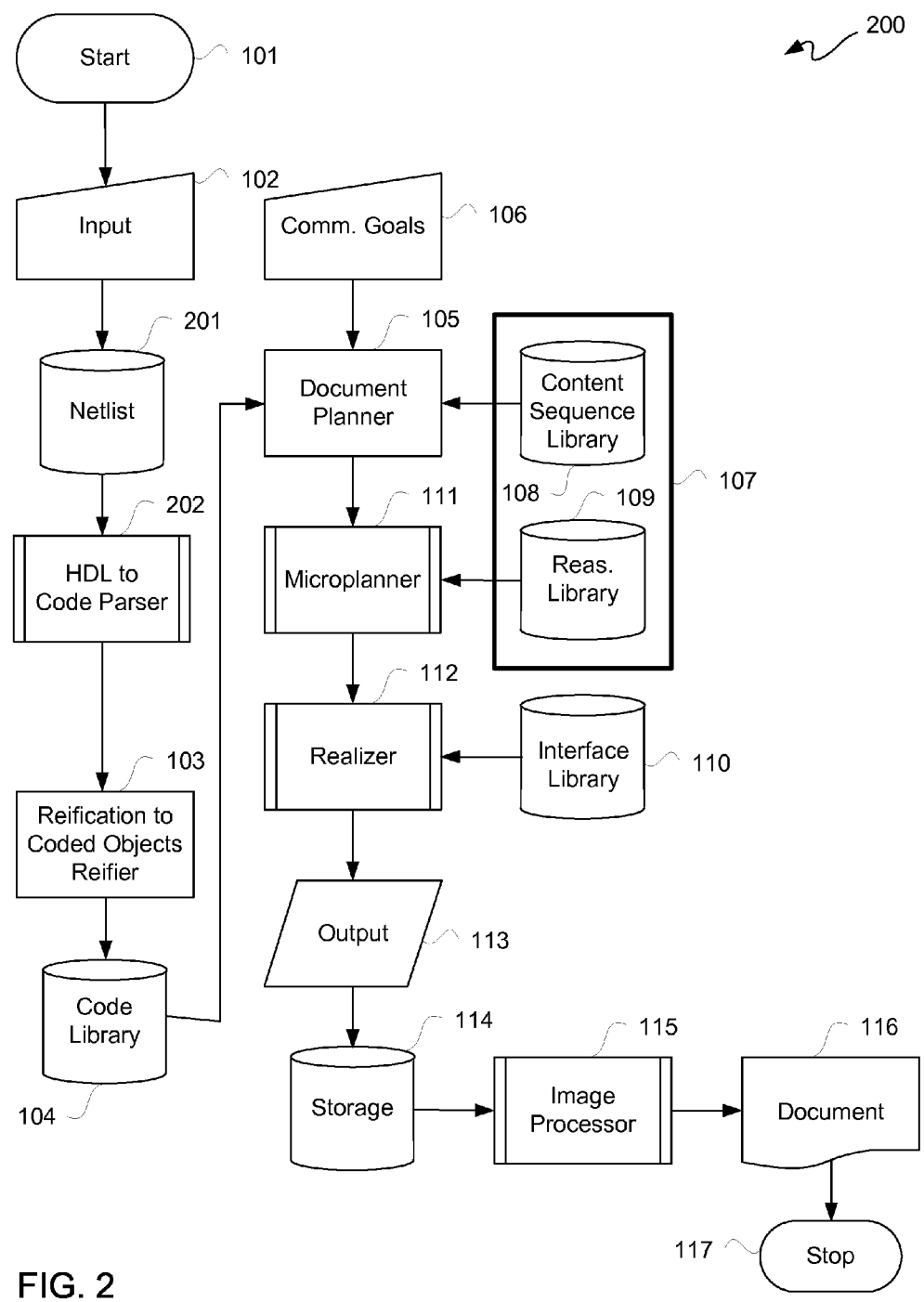
FIG. 2 is a flow diagram depicting an exemplary embodiment of the document generation flow of FIG. 1 for the example of circuit design input.

FIG. 2 is a flow diagram depicting an exemplary embodiment of document generation flow 200. Document generation flow 200 is for the example of circuit design input 102. As many of the components of document generation 200 and document generation flow 100 of FIG. 1 are the same, description of same elements is not repeated.

Again in this example, input 102 is a circuit design. At 201, the circuit design is converted to a netlist, such as in VHDL, Verilog, or other HDL. Netlist 201 is input to an HDL to code parser at 202. For purposes of clarity by way of example and not limitation, it shall assumed that predefined parser 202 for a Verilog to Lisp conversion; however, it should be appreciated that other hardware description languages as well as other object-oriented dynamic binding computer languages may be used.

The parsed Lisp code obtained at 202 is reified to Lisp objects by reifier 103. Such Lisp objects reified at 103 are stored as Lisp code in code library 104. The remainder of flow 200 follows from the previous description of document generation flow 100 of FIG. 1, and thus is not repeated.

Figure 3:
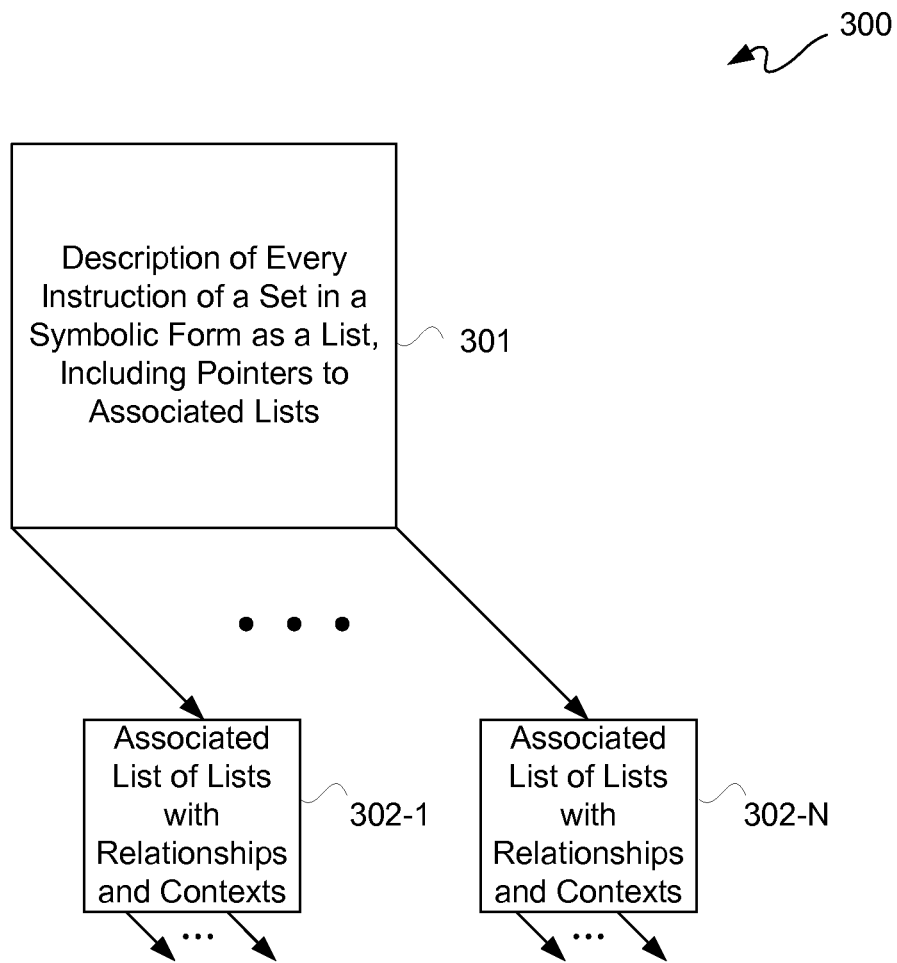
FIG. 3 is a block diagram depicting an exemplary embodiment of a structure for Lisp code, such as may be stored in the code library of the document generation flow of FIG. 1.

FIG. 3 is a block diagram depicting an exemplary embodiment of a structure 300 for Lisp code, such as may be stored in code library 104. At a highest level 301, a description of every element, such as for example every instruction, of a set in a symbolic form as a list, including pointers to associated lists may be used. Thus, in the example of Verilog, each Verilog element may be described as a Lisp element and each of those Lisp elements may be symbolically expressed as objects. The objects may have relationships to other objects, and such other objects may appear in other lists. Accordingly, pointers to associated lists may be used. Thus associated lists 302-1 through 302-N, for N a positive integer greater than 1, generally depict N sublist to list 301. Even though this is shown as a hierarchal structure of lists, where two or more levels may be implemented, it should be understood that a single list, and thus a single level, for some applications may be used. The associated lists may be lists of lists with relationships and contexts of objects to one another. It should be understood that structure 300 may be thought of generally as a linked-pointer representation of data represented by symbols in Lisp.

Figure 4:
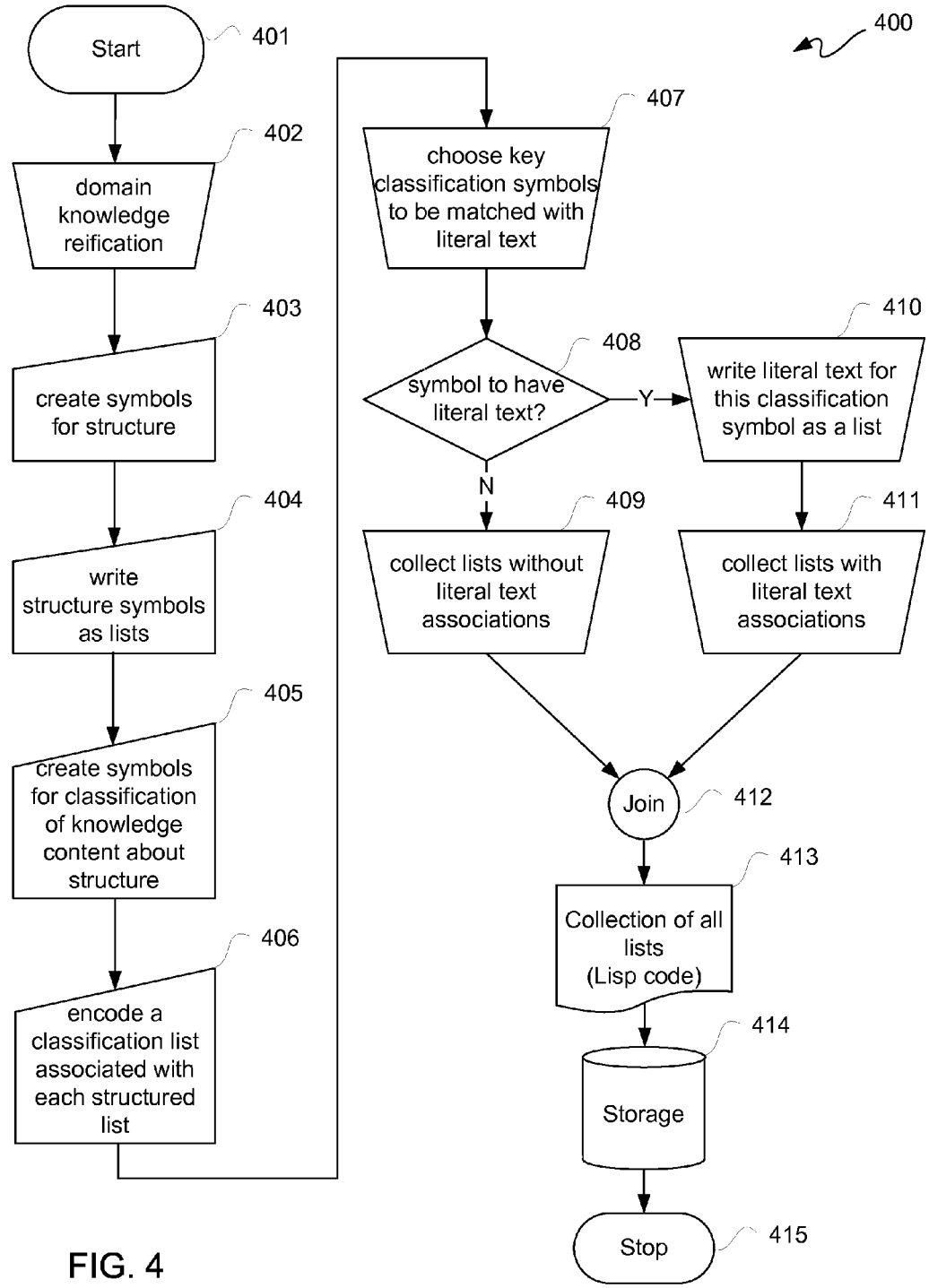
FIG. 4 is a flow diagram depicting an exemplary embodiment of a reification flow.

FIG. 4 is a flow diagram depicting an exemplary embodiment of a reification flow 400. From start 401 to stop 415, reification flow is described as a manual process; however, it should be understood that such process may be automated in whole or in part with computer program coding or scripting. Furthermore, even though the description of FIG. 4 is generally in terms of Lisp coding, it should be understood that other object-oriented dynamic binding computer program languages may be used.

At 402, a defined domain of knowledge is identified and obtained for reification. At 403, symbols for the structure of the domain of knowledge are created. At 404, the symbols are written as lists for a structure of lists, namely structured lists.

At 405, symbols for classification of knowledge content regarding the structure are created. At 406, a classification list associated with each structured list is encoded. At 407, key classification symbols to be matched with literal text are chosen.

At 408, a symbol of the symbols chosen at 407 is selected, and it is determined whether such selected symbol is to have literal text associated with it. This is done at 408 for each of the symbols chosen at 407; however, for purposes of clarity and not limitation, only single symbols are described as processed in operations 408 through 412 of flow 400.

If a symbol selected at 408 is not to have literal text associated with it, then at 409 such symbol is added to a collection of lists without literal text associations. In other words, at 409 lists or list line items without literal text associations are collected.

If, however, at 408 a selected symbol is to have literal text associated with it, then at 410 such literal text is written for such selected symbol, namely a classification symbol, as a list. At 411, such lists with literal text associations are collected.

At 412, lists from collections at 409 and 411 are joined. Such joining may entail concatenating Lisp code from 409 and 411 as text. At 413, all lists from collections at 409 and 411, and joined lists from 412 are provided as a collected output list. Such collected output list may be stored at 414. Storage 414 may be code library 104 of FIGS. 1 and 2.

Figure 5:
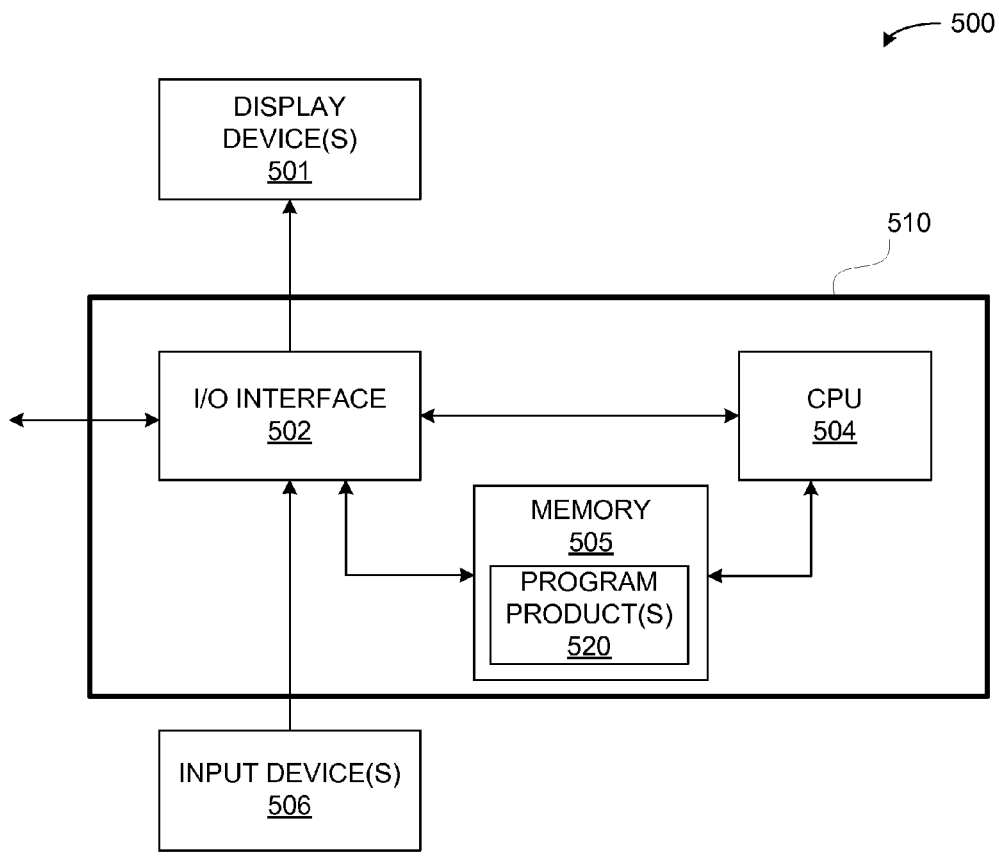
FIG. 5 is a block diagram of an exemplary embodiment of a computer system in which the document generation process as described herein may be implemented.

FIG. 5 is a block diagram of an exemplary embodiment of a computer system 500. Computer system 500 may include a programmed computer 510 coupled to one or more display devices 501, such as Cathode Ray Tube ("CRT") displays, plasma displays, Liquid Crystal Displays ("LCD"), and to one or more input devices 506, such as a keyboard and a cursor pointing device. Other known configurations of a computer system may be used.

Programmed computer 510 may be programmed with a known operating system, which may be Mac OS, Java Virtual Machine, Linux, Solaris, Unix, or a Windows operating system, among other known platforms. Programmed computer 510 includes a central processing unit (CPU) 504, memory 505, and an input/output ("I/O") interface 502. CPU 504 may be a type of microprocessor known in the art, such as available from ARM, IBM, Intel, and Advanced Micro Devices for example. Support circuits (not shown) may include conventional cache, power supplies, clock circuits, data registers, and the like. Memory 505 may be directly coupled to CPU 504 or coupled through I/O interface 502. At least a portion of an operating system may be disposed in memory 505. Memory 505 may include one or more of the following: random access memory, read only memory, magneto-resistive read/write memory, optical read/write memory, cache memory, magnetic read/write memory, and the like, as well as signal-bearing media as described below.

I/O interface 502 may include chip set chips, graphics processors, and daughter cards, among other known circuits. An example of a daughter card may include a network interface card ("NIC"), a display interface card, a modem card, and a Universal Serial Bus ("USB") interface card, among other known circuits. Thus, I/O interface 502 may be coupled to a conventional keyboard, network, mouse, display printer, and interface circuitry adapted to receive and transmit data, such as data files and the like. Programmed computer 510 may be coupled to a number of client computers, server computers, or any combination thereof via a conventional network infrastructure, such as a company's Intranet and/or the Internet, for example, allowing distributed use for interface generation.

Memory 505 may store all or portions of one or more programs or data to implement processes in accordance with one or more aspects of the invention to provide flows 100, 200, or 300, namely "program product(s)" 520. Additionally, those skilled in the art will appreciate that one or more aspects of the invention may be implemented in hardware, software, or a combination of hardware and software. Such implementations may include a number of processors independently executing various programs and dedicated hardware or programmable hardware.

One or more program(s) of the program product(s) 520, as well as documents thereof, may define functions of embodiments in accordance with one or more aspects of the invention and can be contained on a variety of non-transitory signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or hard-disk drive or read/writable CD or read/writable DVD). The above embodiments specifically include information downloaded from the Internet and other networks. Such non-transitory signal-bearing media, when carrying computer-readable instructions that direct functions of one or more aspects of the invention, represent embodiments of the invention.

It should be understand that using symbolic processing to infer meaning for a suitably narrow knowledge domain has been described. As described herein, documents may be generated in natural language, optionally with illustrations, responsive to specific input. By avoiding context, real-world modeling and human perception forms of artificial intelligence, a symbol-only processing system may be implemented to provide document output that is coherent and seemingly intelligently produced. Furthermore, such coherence and production quality is enhanced by having narrow domains of knowledge, such as for example instruction sets, circuit design, computer programs, or other narrow well-defined knowledge domains.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method executed by a processor for documentation generation, comprising:
   reifying input into coded objects in a dynamic language;
   data mining a content-reasoning library to provide meaning of the coded objects;
   wherein the data mining includes determining relationships of the coded objects to one another to provide the meaning;
   wherein the content-reasoning library includes a symbolic representation of knowledge for a defined domain;
   realizing the meaning as a document object model;
   accessing an interface library for converting the document object model into a document; and
   outputting the document.

2. The method according to claim 1, wherein:
   the input is a computer program; and
   the defined domain is an instruction set used for execution of the computer program.

3. The method according to claim 1, wherein:
   the input is a netlist; and
   the defined domain is circuits described using a hardware description language.

4. The method according to claim 1, wherein the data mining includes:
   using a document plan to parse the meaning of the coded objects into a sectionalized structure; and
   extracting content from the content-reasoning library for sections of the sectionalized structure.

5. The method according to claim 4, wherein the realizing the meaning includes populating sections of the document plan with the content in a sequenced organization of phrase structure.

6. The method according to claim 1, wherein the document includes text and graphics.

7. A method executed by a processor for documentation generation, comprising:
   obtaining a reified version of an input as coded objects;
   wherein the input is in an applied form of a symbolic representation of knowledge for a defined domain of knowledge;
   wherein the reified version is a coded form of the applied form;
   wherein the coded objects are in a dynamic language;
   storing the reified version;
   first accessing a content sequence library responsive to the coded objects to extract content for a document plan;

second accessing a reasoning library responsive to the content extracted to provide a sequenced organization of phrase structure for the content extracted; and outputting a natural language representation of the input from a realization of the sequenced organization of phrase structure.

8. The method according to claim 7, wherein the obtaining of the reified version includes:

obtaining an instruction set as the defined domain of knowledge;

reifying the instruction set to provide a lexicon of coded objects from which the coded objects are selectable; and reifying the input by selection of the coded objects therefor from the lexicon of coded objects.

9. The method according to claim 8, wherein:

the instruction set is for a processor; and the input is a computer program including instructions from the instruction set for execution by the processor.

10. The method according to claim 7, wherein the obtaining of the reified version includes:

obtaining a circuits library as the defined domain of knowledge;

reifying the circuits library to provide a lexicon of coded objects from which the coded objects are selectable; and reifying the input by selection of the coded objects therefor from the lexicon of coded objects.

11. The method according to claim 10, wherein:

the circuits library is expressed in a hardware description language; and the input is a netlist expressed in the hardware description language.

12. The method according to claim 7, wherein the dynamic language is an object-oriented dynamic binding language.

13. The method according to claim 12, wherein:

the coded objects are selected responsive to the input from a lexicon for the defined domain of knowledge; and the lexicon is expressed as lists and associated sub-lists of terms with corresponding object codes from which the coded objects are selected.

14. The method according to claim 12, wherein the dynamic language is selected from a group consisting of Lisp, Python, Ruby, and Perl.

15. The method according to claim 7, wherein the first accessing includes data mining of the content sequence library responsive to the coded objects.

16. The method according to claim 15, wherein the content sequence library stores in symbolic form a set of objects for the defined domain of knowledge in structures of nodes with reference listings therefor.

17. The method according to claim 16, wherein the structures of nodes are selected from a group consisting of tree and list structures.

18. The method according to claim 7, wherein the second accessing includes:

iterating over the content extracted for interpreting meaning of the coded objects to provide an interpreted meaning;

producing actions responsive to the interpreted meaning of the coded objects; and producing inferences responsive to the actions for expressing relationships as between the coded objects;

wherein the relationships are determined for providing the natural language representation.

19. The method according to claim 18, wherein the natural language representation is a set of rules for interpreting symbolic objects.

20. A non-transitory, non-signal machine-readable medium having stored thereon information representing instructions that, when executed by general purpose programmed computer, cause the programmed computer to perform operations as a special-purpose programmed computer comprising:

reifying input into coded objects in a dynamic language;

data mining a content-reasoning library to provide meaning of the coded objects;

wherein the data mining includes determining relationships of the coded objects to one another to provide the meaning;

wherein the content-reasoning library includes a symbolic representation of knowledge for a defined domain;

realizing the meaning as a document object model;

accessing an interface library for converting the document object model into a document; and outputting the document.

* * * * *